March 7, 1950 D. GREGG 2,499,993
INERTIA ACTUATED VEHICLE SAFETY DEVICE
Filed April 1, 1948 2 Sheets-Sheet 1
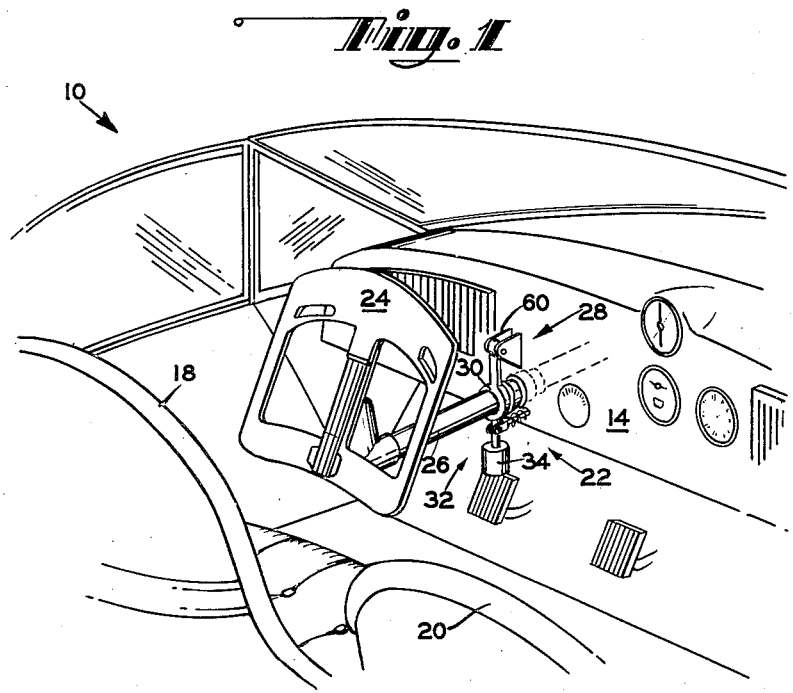
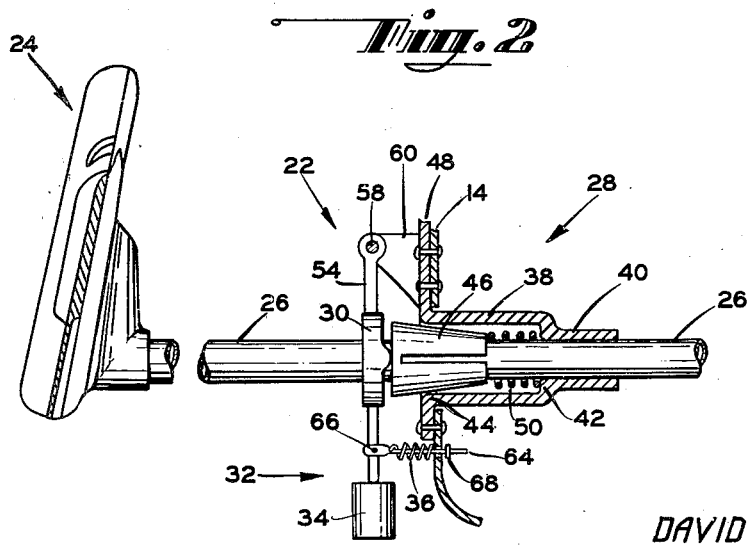
INVENTOR.
DAVID GREGG
BY
Frederic H. Miller
- ATTORNEY -

March 7, 1950  D. GREGG  2,499,993
INERTIA ACTUATED VEHICLE SAFETY DEVICE
Filed April 1, 1948  2 Sheets-Sheet 2
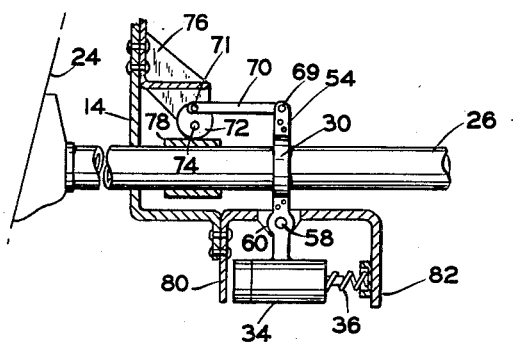
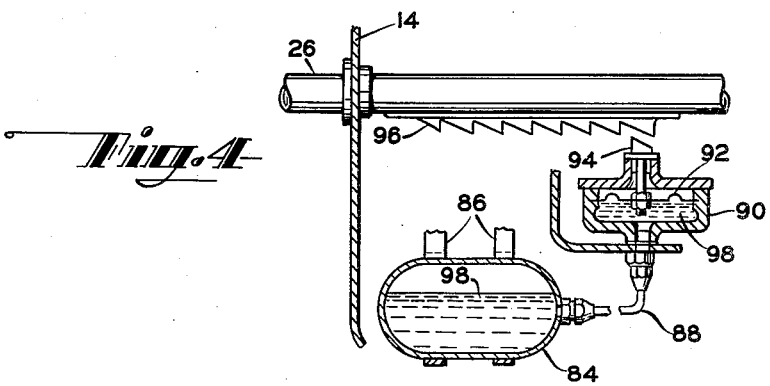
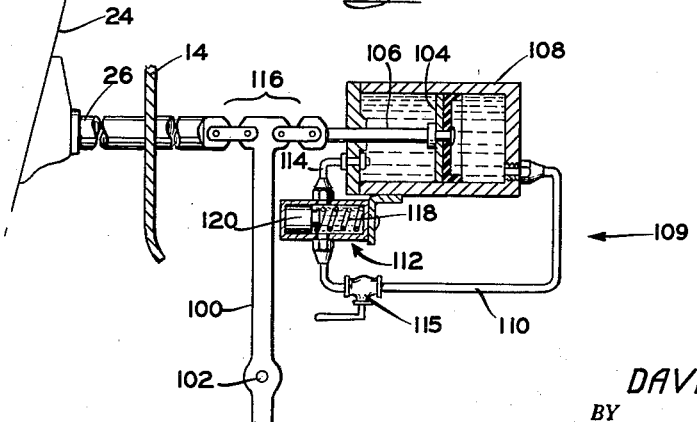
INVENTOR.
DAVID GREGG
BY
Frederic H. Miller
ATTORNEY Patented Mar. 7, 1950

2,499,993

UNITED STATES PATENT OFFICE 2,499,993

INERTIA ACTUATED VEHICLE SAFETY DEVICE

David Gregg, Troy Hills, N. J., assignor to Bendix Aviation Corporation, Teterboro, N. J., a corporation of Delaware Application April 1, 1948, Serial No. 18,381

14 Claims. (Cl. 244—1)

1

The present invention relates to devices adapted to reduce the likelihood of injury to vehicle occupants caused by excessively rapid deceleration of the vehicles, and particularly to a device of such character adapted to protect an aircraft pilot against injury, as by being thrown against the instrument panel.

Just prior to an airplane crash, the natural instinct of a pilot is to pull the control wheel fully back. If the wheel could remain in such position, and if the wheel itself were adapted to arrest motion of the pilot, as by being designed to fit and support the pilot's chest, a substantial advance in means for preventing injuries from certain crashes would be accomplished.

An object of the present invention is to effect such advance, and to do so by novel effective means.

Another object is to provide a mechanism to automatically lock the control column under predetermined excessive deceleration, but to maintain it normally released under all other conditions.

Another object is to provide a mechanism of the type indicated in which the column, if automatically locked as aforesaid in a forward position, may be pulled backwardly and instantly automatically relocked in a rear position.

Another object is to provide a device of the above-indicated general character relative to which an operator or occupant normally assumes a certain position, to which he may freely enter or from which he may freely leave independently of apparatus such as safety straps, belts or other means necessary to be operated for such entering or leaving.

Another object is to provide a device of the above-indicated character which is simple and durable in construction, economical to manufacture, and effective in its operation.

The above and other objects and features of the invention will appear more fully from a consideration of the following description taken in connection with the accompanying drawings wherein several embodiments of the invention are illustrated by way of example.

In the drawings:

Figure 1 is an outline perspective view of a portion of an airplane, illustrating the general appearance of the invention and its environment in one form;

Figure 2 is a side view, partially in elevation and partially in section, of a portion of a control wheel and column embodying the invention in its form of Figure 1, as viewed from the right;

2

Figure 3 is a view similar to Figure 2 of the invention in modified form;

Figure 4 is a view similar to Figure 3 of the invention in another modified form; and Figure 5 is a view similar to Figure 3 of the invention in further modified form.

In all of the figures, corresponding parts are designated by corresponding reference characters.

Referring to the drawings, Figure 1 represents a portion 10 of an airplane cockpit or driver's compartment of a vehicle having an instrument panel 14 or the like, an operator's seat 18 and a co-pilot or rider's seat 20.

A control device 22 of the invention is shown, in this example, as associated with the pilot's seat 18, but another device similar to the device 22 may, of course, be provided in association with the seat 20 either for its control or its protective feature or both. The device 22 includes a control or steering wheel member 24 which, in this instance, is constructed or has portions constructed such that, when the pilot leans or is thrown forward against it, if it is held stationary against his weight, it will fit or receive his body comfortably at the points of contact. Such result may be obtained in various ways as by choice of contours and materials, and by sponge, padded or inflatable arrangements which are automatically conformable to bodies of different contours.

A tube or column 26 carries the control member 24 and is adapted, in normal operative condition for free movement axially of the column relative to the vehicle 10 substantially in, and reversely to, the direction of vehicle travel, which in this case is to the right as illustrated, the control member 24 being constructed, or having portions constructed as aforesaid to arrest motion of the operator relative to the vehicle in the direction of travel for protecting him against injury, as by contact with the panel 14, when the control member 24 is held stationary in position close to him which, as above stated, is the position to which the pilot will ordinarily and instinctively pull the control wheel just prior to a crash.

Means 28, includes an element 30 normally permitting, but adapted for cooperation with the column 26 for retarding the above-mentioned free column movement, and control means 32 includes inertia means 34 normally maintained ineffective, as by a spring 36, to affect the element 30. The means 32 is responsive to predetermined deceleration of the vehicle 10 in the direction of travel to cause actuation of the element 30 relative to the column 26 to retard the aforesaid free movement and cause the arrest of movement of the operator.

The means 28 comprises a cup-like member 38 having a bearing portion 40 for the column 26, an inner shoulder 42, a portion 44 for wedge-lock contact with a split cone 46 and a flange 48 attached to the face of the panel 14. The cone 46, which axially slidably surrounds the column 26, is normally held, as by a spring 50 around the column extending between the cone and the shoulder 42, in a left-hand position, as illustrated, in which position of the cone the column 26 is freely movable.

The means 32 comprises a lever arm 54, carrying the inertia means or weight member 34, pivoted, as by a pin 58, to a bracket 60 on the flange 48.

The element 30 constitutes a ring-like intermediate portion of the lever 54 which surrounds the column 26, and which is adapted to engage the cone 46 against the action of the spring 50 to wedge the cone between the portion 44 and the column 26 to lock the latter against its normal axial movement.

A rod 64, pivotally connected, as by a pin 66, to the arm 54, extends through a hole in the panel 14. The rod 64 carries a nut 68, and is surrounded by the expansion spring 36 normally biasing the arm 54 to the left, to the position shown, in which position the element 30 does not affect the cone 46 or the column 26.

In operation, under normal conditions, the convenience and usual movements of the occupant or occupants are substantially the same as though the apparatus of the present invention were not present. The pilot or driver may enter and leave his position relative to the seat 18 the same as he could in a plane not equipped with the device, without any thought of, or action required by, the invention.

If, as in making an emergency landing, when a crash appears inevitable, and the plane is about to decelerate more rapidly than it would by any normal operational design by the pilot, the latter may, and probably instinctively will, pull the wheel 24 fully back.

Under such deceleration, the weight member 34 will swing forwardly, or to the right as shown in Figures 1 and 2, against the action of the spring 36, which action causes the element 30 to push the cone 46, to the right, against the action of the spring 50, and the cone 46 to wedge between the column 26 and the portion 44 of the cup 38. This action stops forward movement of the column 26 and, with the wheel in its position close to the pilot's chest as mentioned, arrests motion of the pilot and prevents him from being thrown out of his seat, and protects him from injury to a corresponding extent.

In the form of Figure 3, the construction and operation are similar to those of Figures 1 and 2, with exceptions, such as the shape and location of certain parts. The lever 54, carrying the element 30, pivotally mounted on a pin 58 under the panel 14 is pivotally connected by a pin 69 to a link 70, which is pivotally connected by a pin 71 to a cam 72 which is pivotally mounted, as by a pin 74. The latter is supported in a bracket 76 in position relative to the cam 72 such that, when the weight member 34 is moved forwardly against the action of the spring 36, the cam 72 acts against friction plate means 78 to force the latter into frictional engagement with the column 26 to bring the wheel 24 to a gradual or cushion stop, which may be adjusted according to different factors, such as the weight of the driver, and the distance of the cushion movement. Plate or stop portions 80 and 82, on the panel 14 and having support portions 60 for the pin 58, are provided for limiting leftward movement of the weight 34 and for backing the spring 36, respectively.

In the form of Figure 4, a tank 84, supported as by brackets 86, is connected, as by a pipe 88, to a housing 90 at one side of a flexible diaphragm 92. A pawl 94, connected to the other side of the diaphragm 92, is adapted for cooperation with a ratchet 96 carried by the column 26.

Thus, under the decelerating conditions abovementioned, a fluid body 98, as of liquid, in the tank 98, is operated by its inertia against the diaphragm 92 to engage the pawl 94 to the ratchet 96. The level of the liquid in the tank may normally be substantially in a plane of the diaphragm 92.

Also, in the form of Figure 4, the pawl and ratchet structure may operate similarly to an overrunning clutch device, which locks the column against forward movement, but permits backward movement for instant relocking in a more rearward position should the inertia lock take effect prior to backward movement of the wheel 24 by the pilot, the equivalent of which device may, of course, be employed in the invention in any desired form.

In the form of Figure 5, a lever 100, connected between the column 26 and controls which it is to operate, is pivoted at an intermediate point for movement about the axis of a pin or shaft 102.

A piston 104, having a rod 106, is disposed in a cylinder 108, with a fluid circuit 109 connected to the cylinder between opposite sides of the piston, comprising a pipe 110, an inertia valve device 112, a pipe 114, and a pet cock 115. The circuit 109 contains a fluid, such as air, vapor or a combination thereof, to afford shock-absorbing action of the piston 104 for the wheel 24.

A system of links 116, connected between the column 26 and the piston rod 106, and to the lever 100, adapts the linear movement of the column 26 and the rod 106 to the angular movement of the lever 100.

A spring 118 in the valve 112 normally biases an inertia valve member 120 to open position relative to the pipes 110 and 114 such that the column 26, the piston 104 and the lever 100 are freely movable.

In operation, of the device of Figure 5, when the predetermined deceleration occurs, the inertia valve member 120 acts against the spring 118 to close the valve 112, which locks the fluid of the circuit 109 and limits movement of the piston 104 substantially to the value permitted by the compressibility of the fluid from the right hand side of the piston 104 to the under side of the valve 112, as these parts are illustrated.

The pet cock 115, which may be readily accessible from the cockpit 10 or otherwise located, will be open during operation of the craft, and may be closed while parking for locking the control device in inactive condition. Means equivalent to the cock may, of course, be employed with each form of the invention and be manually, electrically, fluid or otherwise operated.

Although several embodiments of the invention have been illustrated and described, various changes in the form and relative arrangements of the parts may be made to suit requirements.

What is claimed is:

1. The combination of an aircraft control device including a control wheel member and a column carrying the wheel and adapted in normal operative condition for free movement axially of the column relative to the craft substantially in and reversely to the direction of travel of the craft, said wheel being adapted to arrest motion of a pilot relative to the craft in said direction and having portions adapted to substantially conform to the pilot's chest for protecting him against injury, means including an element normally permitting, but adapted for cooperation with the column for stopping, said free movement, and means including inertia means normally maintained ineffective to affect said element and responsive to predetermined deceleration of the plane in said direction to cause actuation of the element relative to the column to stop said free movement and cause said arrest.

2. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including an element normally permitting, but adapted for cooperation with the column for restraining, said free movement, and means including inertia means normally maintained ineffective to affect said element and responsive to predetermined deceleration of the vehicle in said direction to cause actuation of the element relative to the column to restrain said free movement and cause said arrest.

3. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including an element movable relative to the column between a location disengaging the same for permitting, and a location engaging the column for restraining, said free movement, spring means, means including a weighted pivoted lever and a portion adapted to cooperate with said element normally maintained by said spring means ineffective to affect said element and responsive to predetermined deceleration of the vehicle in said direction to cause said element to engage the column to restrain said free movement and cause said arrest.

4. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including an element normally permitting, but adapted for cooperation with the column for restraining, said free movement, and fluid-operated means including inertia means normally maintained ineffective to affect said element and responsive to predetermined deceleration of the vehicle in said direction to cause actuation of the element relative to the column to restrain said free movement and cause said arrest.

5. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including an element normally permitting, but adapted for cooperation with the column for stopping, said free movement, and means including a liquid inertia body normally maintained ineffective to affect said element and responsive to predetermined deceleration of the vehicle in said direction to cause actuation of the element relative to the column to stop said free movement and cause said arrest.

6. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including a fluid brake normally permitting, but adapted for cooperation with the column for retarding, said free movement, and means including an inertia-operated valve in the circuit of and normally maintained ineffective to affect said brake and responsive to predetermined deceleration of the vehicle in said direction to affect the brake fluid to retard said free movement and cause said arrest.

7. The combination of a vehicle control device including a control member and a column carrying the control member and adapted in normal operative condition for free movement axially of the column relative to the vehicle substantially in and reversely to the direction of vehicle travel, said control member having a portion adapted to arrest motion of an operator relative to the vehicle in said direction for protecting him against injury, means including a fluid brake normally permitting, but adapted for cooperation with the column for retarding, said free movement, means including an inertia-operated valve in the circuit of and normally maintained ineffective to affect said brake and responsive to predetermined deceleration of the vehicle in said direction to affect the brake fluid to retard said free movement and cause said arrest, and means for locking the fluid in said circuit.

8. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control device for restraining, said free movement, and means including control means normally maintained ineffective to affect said element and responsive to predetermined deceleration of the vehicle in said direction to cause actuation of the element relative to said device to restrain said free movement and cause said arrest.

9. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, first means including an element normally permitting, but adapted for operative relation to said control device for retarding, said free movement, and second means including control means normally maintained ineffective to affect said element and responsive to predetermined deceleration of the vehicle in said direction to cause actuation of the element relative to said device to retard said free movement and cause said arrest, said first means being effective, when said second means operates to retard said free movement in a forward position of the control member, to permit rearward movement of said device to a location for retardation of forward motion from said location.

10. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control device for retarding, said free movement, means including control means normally maintained ineffective to affect said element and responsive to predetermined deceleration of the vehicle in said direction to cause actuation of the element relative to said device to retard said free movement and cause said arrest, and means for locking the control device in inactive condition.

11. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control member for retarding, said free movement, spring means, means including a weighted pivoted lever and a portion adapted to cooperate with said element normally maintained by said spring means ineffective to affect said element and responsive to predetermined deceleration of the vehicle in said direction to place said element in operative relation to said control member to retard said free movement and cause said arrest.

12. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control member for restraining, said free movement, and fluid-operated means including inertia means normally maintained ineffective to affect said element and responsive to predetermined deceleration of the vehicle in said direction to cause actuation of the element relative to said member to restrain said free movement and cause said arrest.

13. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control member for preventing said free movement, and means including a liquid inertia body normally maintained ineffective to affect said element and responsive to predetermined deceleration of the vehicle in said direction to cause actuation of the element relative to said member to prevent said free movement and cause said arrest.

14. The combination of a vehicle control device adapted in normal operative condition for free movement relative to the vehicle substantially in and reverse to the direction of vehicle travel and including a control member adapted to arrest motion of an operator relative to the vehicle in said direction for protecting him against injury, means including an element normally permitting, but adapted for operative relation to said control member for restricting, said free movement, means including a fluid brake normally permitting, but adapted for operative relation to said member for retarding, said free movement, and means including an inertia-operated valve normally maintained ineffective to affect said brake and responsive to predetermined deceleration of the vehicle in said direction to affect the brake fluid to restrict said free movement and cause said arrest.

DAVID GREGG.

REFERENCES CITED

The following references are of record in the file of this patent:

UNITED STATES PATENTS

| Number | Name | Date |
| --- | --- | --- |
| 2,071,903 | Shivley | Feb. 23, 1937 |
| 2,322,755 | Voorhies | June 29, 1943 |
| 2,416,375 | Bunyard | Feb. 25, 1947 |